US009738534B2

(12) United States Patent
Kobayashi et al.

(10) Patent No.: US 9,738,534 B2
(45) Date of Patent: Aug. 22, 2017

(54) POROUS SILICA POWDER (71) Applicant: Shinwa Chemical Industries Ltd., Kyoto-shi (JP)

(72) Inventors: Hiroshi Kobayashi, Kyoto (JP); Kouji Fujimura, Kyoto (JP); Kanta Nakano, Kyoto (JP)

(73) Assignee: Shinwa Chemical Industries Ltd., Kyoto-shi (JP)

( * ) Notice: Subject to any disclaimer, the term of this patent is extended or adjusted under 35 U.S.C. 154(b) by 0 days.

(21) Appl. No.: 14/415,017

(22) PCT Filed: Aug. 26, 2013

(86) PCT No.: PCT/JP2013/072674
§ 371 (c)(1),
(2) Date: Jan. 15, 2015

(87) PCT Pub. No.: WO2014/034588
PCT Pub. Date: Mar. 6, 2014

(65) Prior Publication Data
US 2015/0166353 A1    Jun. 18, 2015

(30) Foreign Application Priority Data
Aug. 27, 2012 (JP) ................. 2012-186757

(51) Int. Cl.
| B01J 20/10 | (2006.01) |
| C01B 33/18 | (2006.01) |
| B01J 20/28 | (2006.01) |
| B01J 20/30 | (2006.01) |
| B01D 53/02 | (2006.01) |
| B01J 20/283 | (2006.01) |
| C08K 7/26 | (2006.01) |
| C01B 33/12 | (2006.01) |

(52) U.S. Cl.
CPC ............. *C01B 33/18* (2013.01); *B01D 53/02* (2013.01); *B01J 20/103* (2013.01); *B01J 20/283* (2013.01); *B01J 20/28004* (2013.01); *B01J 20/28011* (2013.01); *B01J 20/28016* (2013.01); *B01J 20/28059* (2013.01); *B01J 20/28071* (2013.01); *B01J 20/28085* (2013.01); *B01J 20/3028* (2013.01); *B01J 20/3078* (2013.01); *B01J 20/3085* (2013.01); *C08K 7/26* (2013.01); *B01D 2253/106* (2013.01); *B01J 2220/80* (2013.01); *C01B 33/12* (2013.01); *C01P 2004/51* (2013.01); *C01P 2006/12* (2013.01); *C01P 2006/14* (2013.01); *C01P 2006/16* (2013.01)

(58) Field of Classification Search
CPC ........ B01J 20/109; B01J 20/103; C01B 33/12
USPC ........ 502/407; 423/335, 336, 337, 338, 339, 423/340
See application file for complete search history.

(56) References Cited

U.S. PATENT DOCUMENTS

2012/0048145 A1*  3/2012  Wang et al. .................. 106/457

FOREIGN PATENT DOCUMENTS

| FR | 2105908 A5 | 4/1972 |
| GB | 1362331 | 8/1974 |
| GB | 1371440 | 10/1974 |
| JP | 2000154017 A | 6/2000 |
| JP | 2002362918 A | 12/2002 |
| JP | 2005290032 A | 10/2005 |
| JP | 200669824 A | 3/2006 |
| JP | 20126783 A | 1/2012 |
| WO | 9825851 A1 | 6/1998 |
| WO | 03002458 A1 | 1/2003 |

OTHER PUBLICATIONS

Nakanishi, Pore Structure of Silica Gels Based on Phase Separation, Journal of Porous Materials, 1997, pp. 67-112.

* cited by examiner

*Primary Examiner* — Matthew E Hoban
*Assistant Examiner* — James Fiorito
(74) *Attorney, Agent, or Firm* — The Webb Law Firm (57) ABSTRACT

An object of the present invention is to provide a porous silica powder suitable for, for example, a gas chromatography support, and the porous silica powder has an average pore diameter of 0.5 to 10 μm as determined by a mercury intrusion method, a volume of pores having a 100 nm or smaller pore diameter of 0.2 $cm^3$/g or less as determined by a nitrogen gas adsorption method, a specific surface area of 0.5 to 100 $m^2$/g as determined by a nitrogen gas adsorption method, and a particle size distribution of 10 to 1000 μm.

8 Claims, 5 Drawing Sheets

(a) Comparative Example 1

(b) Comparative Example 2

(c) Example 1

(d) Example 2

(e) Example 3

FIG. 1

(f) Example 4

(g) Example 5

(h) Example 6

POROUS SILICA POWDER

CROSS-REFERENCE TO RELATED APPLICATIONS

This application is the United States national phase of International Application No. PCT/JP2013/072674 filed Aug. 26, 2013, and claims priority to Japanese Patent Application No. 2012-186757 filed Aug. 27, 2012, the disclosures of which are hereby incorporated in their entirety by reference.

TECHNICAL FIELD

The present invention relates to a porous silica powder suitable for, for example, a gas chromatography support.

BACKGROUND ART

As a gas chromatography support, sintered diatomaceous earth, which has an appropriate specific surface area, heat resistance, and physical strength, has been widely used since gas chromatography has come into widespread use. However, diatomaceous earth is a natural product, and thus performance as a support varies according to the different mining site, stratum, and the like. Moreover, because diatomaceous earth contains, in addition to silicon dioxide as its main component, metal oxides such as aluminum oxide and iron oxide, these metal oxides serve as factors that cause adsorption of an analyte.

Accordingly, there is a demand for providing a support with a controllable bulk specific gravity, specific surface area, and pore volume without containing impurities such as metal oxides so as to exhibit sufficient performances as a gas chromatography support, together with having a shape, heat resistance, and physical strength usable for a gas chromatography support which replaces diatomaceous earth.

Recently, a silica monolith porous body prepared by a sol-gel method from an organosilicate as a raw material has been attracting attention as a liquid chromatography filler because, for example, it has a large specific surface area, is physically and chemically stable, and can be formed into a variety of shapes (Non-Patent Literature 1). A Silica monolith body has a structure of a three-dimensionally networked porous silica skeleton and flow channels in a body, and are especially expected for use as a liquid chromatography fillers enabling high speed analyses because flow resistance can be lowered in comparison with conventional particulate fillers by adjusting a ratio of mesopores (pore diameter 2 to 50 nm) and micropores (pore diameter 2 nm or less) to macropores (pore diameter 0.5 to 10 μm) that function as flow channels of a carriers.

CITATION LIST

Patent Literature

Patent Literature 1: WO 03/002458
Patent Literature 2: JP 2006-69824A
Patent Literature 3: JP 2005-290032A
Patent Literature 4: JP 2002-362918A
Patent Literature 5: JP 2012-6783A

Non-Patent Literature

Non-Patent Literature 1: K. Nakanishi: J. Porous Materials, 4, 67 (1997)

SUMMARY OF INVENTION

Technical Problem

Silica monolith porous bodies known to date are those in which mesopores and macropores are increased by improving a reagent to be used, synthesis method, or the like so as to impart a gas or liquid adsorbability to the bodies, and those improved to be suitable for separation agents for liquid chromatography by, for example, forming fine pores such as mesopores or micropores isotropically to enhance separation performance (Patent Literatures 1 to 4). However, a silica monolith porous body suitable for a gas chromatography support is not known.

Therefore, the present invention was conceived in order to provide a porous silica powder suitable for, for example, a gas chromatography support.

Solution to Problem

As described above, silica monolith porous bodies are widely used as liquid chromatography fillers. However, in gas chromatography, the surface of a support is coated with a liquid phase to separate an analyte by taking advantage of the properties of the liquid phase, and therefore the use of a silica monolith porous body as a gas chromatography support is problematic by, for example, allowing the analyte to enter fine pores such as mesopores and micropores and resulting in tailing of chromatogram peaks. Moreover, with the use of a silica monolith porous body as a gas chromatography support, separation that is dependent on the properties of the coated liquid phase is cancelled by separation that is dependent on the properties of the fine pores of the support, and thus makes it impossible to obtain a separation ability necessary as a gas chromatography support.

However, the inventors found that excellent performance for a gas chromatography support can be obtained by preparing a porous silica with a predetermined surface area by adjusting macropores and the like to give an optimized shape while reducing fine pores such as mesopores and micropores of a silica monolith porous body to reduce the pore volume derived from the fine pores, and then powdering this porous silica, and accomplished the present invention thereby.

That is, the porous silica powder according to the present invention has an average pore diameter of 0.5 to 10 μm as determined by a mercury intrusion method, a volume of pores having a 100 nm or smaller pore diameter of 0.2 cm$^3$/g or less as determined by a nitrogen gas adsorption method, a specific surface area of 0.5 to 100 m$^2$/g as determined by a nitrogen gas adsorption method, and a particle size distribution of 10 to 1000 μm.

In such a porous silica powder according to the present invention, due to the fact that fine pores such as mesopores and micropores are extremely few, the pore volume derived from fine pores is small and, also, the specific surface area is small. However, as can be understood from, for example, a description in Patent Literature 5, even with a reduced specific surface area as in the present invention, various porous silica powders having different physical properties are obtained in accordance with the pore size distribution of remaining pores, and porous silica powders having physical properties similar to those of the present invention cannot necessarily be obtained. Moreover, in the porous silica powder according to the present invention, it is not only that fine pores are few, but also that the values of the average pore diameter, pore volume derived from fine pores, and specific surface area are within the predetermined numerical ranges, and therefore the porous silica powder exhibits a high level of separation performance, adsorption performance, and liquid-phase retention amount, and serves as an excellent support for gas chromatography analyses.

Moreover, unlike diatomaceous earth, which is a natural product, the porous silica powder according to the present invention is composed of high-purity silica (silicon dioxide) and therefore neither has a variation in performance nor substantially contains metal oxides that are factors causing analyte adsorption.

Regarding the physical properties of the porous silica powder according to the present invention, furthermore, it is preferable that the average pore diameter is 0.8 to 5.0 μm, the pore volume is 0.001 to 0.1 cm$^3$/g, and the specific surface area is 0.7 to 50.0 m$^2$/g.

Moreover, it is preferable that the porous silica powder according to the present invention has a bulk specific gravity of 0.2 to 0.7 g/mL.

The method for producing the porous silica powder according to the present invention is not particularly limited, and, for example, it can be obtained by pulverizing or granulating porous silica formed from a reaction mixture comprising acid, a water-soluble polymer, and organosilicate. Furthermore, it is preferable that the porous silica is formed from the reaction mixture using a sol-gel method, followed by firing before or after the pulverization or granulation.

The application of the porous silica powder according to the present invention is not particularly limited, and examples include a gas chromatography support, an adsorbent for a liquid component or a gas component, and the like. This gas chromatography support and adsorbent for a liquid component or a gas component are also aspects of the present invention.

Advantageous Effects of Invention

Thus, according to the present invention, it is possible to obtain a porous silica powder with a shape, heat resistance and physical strength that are favorably applicable to a gas chromatography support, the powder possessing a high level of separation performance, adsorption performance, and liquid-phase retention amount, which are basic performances of the gas chromatography support, and further, the powder having excellent reproducibility and stability.

DESCRIPTION OF EMBODIMENTS

Below, the present invention will now be described in detail.

Although the porous silica powder according to the present invention has a structure in which a three-dimensionally networked skeleton and macropores are integrated, fine pores such as mesopores and micropores in the skeleton are significantly fewer than in conventionally known silica monolith porous bodies.

Such a porous silica powder according to the present invention has an average pore diameter of 0.5 to 10 μm as determined by a mercury intrusion method, a volume of pores having a 100 nm or smaller pore diameter of 0.2 cm$^3$/g or less as determined by a nitrogen gas adsorption method, and a specific surface area of 0.5 to 100 m$^2$/g as determined by a nitrogen gas adsorption method. Furthermore, the porous silica powder according to the present invention has a particle size distribution of 10 to 1000 μm so as to be usable as, for example, a support for gas chromatography and a filler for a concentration tube.

Furthermore, the average pore diameter is preferably 0.8 to 5.0 μm, the pore volume is preferably 0.001 to 0.1 cm$^3$/g, the specific surface area is preferably 0.7 to 50.0 m$^2$/g and more preferably 1.0 to 10.0 m$^2$/g, and the particle size distribution is preferably 100 to 700 μm. Here, the pore volume refers to the value obtained by, for example, performing nitrogen adsorption-desorption measurement at −196° C. and applying a Dollimore-Heal method, an MP method, or the like to the resulting adsorption-desorption isotherm, and the specific surface area refers to the value obtained by applying a BET plot to the resulting adsorption-desorption isotherm.

When the specific surface area is smaller than the range specified herein (or when the pore volume is smaller than the range specified herein), fine pores are excessively few, and therefore the use of such a porous silica powder as a gas chromatography support results in a small retention amount of the liquid phase and thus a broad chromatogram peak shape. On the other hand, when the specific surface area is larger than the range specified herein (or the pore volume is larger than the range specified herein), fine pores are excessive, and therefore the use of such a porous silica powder as a gas chromatography support results in analyte adsorption and thus tailing of a chromatogram peak.

The porous silica powder according to the present invention forms a distinctive isotropic space and, when used as a gas chromatography support, provides high reproducibility for mass transfer of gas components and enables a highly reproducible measurement that yields a sharp chromatogram peak shape.

The porous silica powder according to the present invention has a bulk specific gravity of preferably 0.2 to 0.7 g/mL and more preferably 0.3 to 0.5 g/mL. Here, the bulk specific gravity refers to the value obtained by pouring a powder having a volume of 100 mL into a graduated cylinder and then measuring the weight of the powder. A porous silica powder with a bulk specific gravity of less than 0.2 g/mL has excessive fine pores, and therefore the use of such a porous silica powder as a gas chromatography support is likely to result in analyte adsorption and thus tailing of a chromatogram peak. On the other hand, in a porous silica powder with a bulk specific gravity exceeding 0.7 g/mL, fine pores are excessively few, and therefore the use of such a porous silica powder as a gas chromatography support is likely to result in a small retention amount of the liquid phase and thus a broad chromatogram peak shape.

The method for producing the porous silica powder according to the present invention is not particularly limited, and it can be produced by, for example, preparing a reaction mixture containing acid, a water-soluble polymer, and organosilicate, forming porous silica having an isotropic space using a sol-gel method, and pulverizing or granulating the resulting porous silica.

Such a method for producing the porous silica powder according to the present invention using a sol-gel method has, for example, the following steps.

(1) Mixing acid and a water-soluble polymer
(2) Adding organosilicate to the mixture obtained in step (1) to form a suspension and thus prepare a reaction mixture
(3) Gelling the reaction mixture obtained in step (2)
(4) Drying the gel obtained in step (3) to form porous silica
(5) Firing the porous silica obtained in step (4)
(6) Pulverizing or granulating the fired porous silica obtained in step (5) for classification The acid is not particularly limited, and examples include organic acids such as acetic acid, butyric acid, formic acid, and citric acid; and inorganic acids such as nitric acid, hydrochloric acid, and sulfuric acid. Among these, volatile acids such as hydrochloric acid, nitric acid, formic acid, and acetic acid are suitably used. The acid is contained in the liquid reaction mixture so that hydrolysis of organosilicate in a sol-gel method is carried out under an acidic condition of preferably pH 1 to 6 and more preferably pH 2 to 5.

The water-soluble polymer is not particularly limited as long as it can function as a pore forming agent, and examples include polyethylene glycol (a molecular weight of 200 to 500000), acidic organic polymers such as polyvinyl acetate, and the like. Among these, polyethylene glycol is suitably used.

The amount of the water-soluble polymer contained is preferably 0.01 to 50.0 g, more preferably 0.05 to 10.0 g, and even more preferably 0.1 to 5.0 g, based on 0.0167 mol of silicon atoms in the reaction system (a weight of 1.0 g in terms of anhydrous silica). The amount of the water-soluble polymer contained in the reaction mixture is dependent also on the temperature of gelation, which will be described below, and there is a tendency that the higher the gelation temperature, the lower the required amount of the water-soluble polymer, and the lower the gelation temperature, the higher the required amount of the water-soluble polymer.

The organosilicate is not particularly limited, and examples include tetraalkoxysilanes ((RO)$_4$Si). Here, examples of R include C1-C20 alkyls, C2-C20 alkenyls, C5-C20 aryls, and the like, and C1-C8 alkyls are preferable. In the tetraalkoxysilanes, all 4 R's may be the same, and some may be different. The tetraalkoxysilanes are not particularly limited, and, for example, tetraethoxysilane, tetramethoxysilane, and the like are suitably used.

The organosilicate is also not limited to being in a monomeric form, and, for example, it may be in an already polymerized form, such as an oligomer.

In steps (3) and (4), first, starting materials such as organosilicate undergo hydrolysis under acidic conditions in the presence of a water-soluble polymer, thus a polymerizable low-molecular species is produced, and gelation begins. Then, the gel is aged to produce an agglomerated or polymerized substance via a polymerization reaction or a polycondensation reaction.

More specifically, in steps (3) and (4), pouring the reaction mixture into a container of any shape and leaving it to stand still in a heated state initiates gelation. The heating temperature at this time is not particularly limited, and is preferably 10 to 60° C. and more preferably 20 to 50° C. Thereafter, carrying out a reaction for a predetermined period of time while maintaining the heated state allows aging of the gel to progress, and solidified porous silica is formed. The reaction time is not particularly limited, and is preferably 2 hours or longer and more preferably 5 hours or longer.

Furthermore, in the production method, after step (3) or (4), the resulting porous silica may be immersed in, for example, water, alcohol such as methanol, or a mixed solution thereof to remove unnecessary components such as the free alcohol as well as the acid and the water-soluble polymer.

In step (5), further, the resulting porous silica is fired to melt the silica surface so as to remove the remaining fine pores. This also enables the silica skeleton to be strengthened at the same time. Firing is performed preferably at 700° C. or higher for 30 minutes to 12 hours, and more preferably at 800 to 1200° C. for 30 minutes to 6 hours.

In step (6), the porous silica obtained through step (5) is pulverized or granulated, and classified to give a particle size of 10 to 1000 μm, preferably 50 to 1000 μm, and more preferably 100 to 700 μm. The pulverization method in step (6) is not particularly limited, and examples include methods in which pulverization is performed using a crusher, mill, or the like. Moreover, the granulation method is not particularly limited, and examples include tumbling granulation, fluid bed granulation, agitation granulation, compression granulation, extrusion, and various like methods. Furthermore, the classification method as well is not particularly limited, and examples include a technique in which particles with a desired particle size distribution are sieved.

The order of step (5) and step (6) may be inverted.

The method for producing the porous silica powder according to the present invention is not limited to the aforementioned method in which a sol-gel method is used, and, for example, a method in which glass is treated together with a layer separating agent at a high temperature of about 1500° C. can also be used.

The porous silica powder according to the present invention can be suitably used as a gas chromatography support. Here, the "gas chromatography support" refers to a solid phase that, when a non-volatile liquid is applied thereto, retains this liquid phase.

The non-volatile liquid used for the liquid phase is not particularly limited, and may be suitably selected according to the analyte. Examples include paraffinic hydrocarbons such as Apiezon L, squalene, hexatriacontane, n-hexadecane, and n-dodecane; fluorine-containing oils such as Kel F Oil No. 3, halocarbon oil, and Fluorolube HG 1200; monoesters such as dibutyl maleate (DBM), dioctyl phthalate (DOP), dioctyl sebacate (DOS), dinonyl phthalate (DNP), and Flexol 8N8; polyesters such as FFAP, FON, Thermon-1000, Thermon-3000, 1,4-BDS, DEGS, DEGA, EGA, EGS, NGS, and NGA; alcohols such as glycerol, Hyprose SP-80, mannitol, and undecanol; ethers such as polyphenylether and bis(2-butoxyethyl)phthalate; polyethylene glycols; polyglycols such as Ucons; amides such as Poly-A series and Versamide 900; amine acids such as Quadrol and triethanolamine; nitriles such as N,N-bis(2-cyanoethyl)formamide (BCEF), 1,2,3-tris(2-cyanoethoxy)propane (TCEP), and β,β'-oxydipropionitrile (ODPN); nitro compounds such as Alukaterge T and 4,4-azoxydianisole; silicones such as methyl silicone, methyl phenyl silicone, methyl phenyl vinyl silicone, trifluoropropyl silicone, cyanoalkyl methyl silicone, and cyanopropyl phenyl silicone; sulfur compounds such as dimethyl sulfide, polysulfone, and Poly-S series; phosphates such as tricresyl phosphate (TCP) and trixylyl phosphate (TXP); and the like.

Moreover, the porous silica powder according to the present invention can also be used as a filler for concentration or a filler for an impurity removing tube. That is to say, coating the porous silica powder according to the present invention with a liquid phase, filling a small diameter tube with the coated powder, and allowing gas to flow through the tube enable adsorption/concentration of components in the gas that readily dissolve in the liquid phase. Accordingly, the porous silica powder according to the present invention can be used for removing impurities in gas by adsorption and for preparing a sample that is more enriched than its starting material by subjecting concentrated components to elimination/extraction with heat or a solvent.

The small diameter tube is not particularly limited, and, for example, a NeedlEx (manufactured by Shinwa Chemical Industries Ltd.), which is a solid-phase microextraction needle as described in JP 2004-137341A, can be used.

Furthermore, the porous silica powder according to the present invention can be used also as a catalyst support by allowing fine metal particles to be supported on the surface. The fine metal particles are not particularly limited, and examples include nickel and the like. In order for fine metal particles to be supported on the surface of the porous silica powder according to the present invention, for example, a method can be used in which porous silica is impregnated with a solution containing a metal compound and then only the solvent is volatilized.

Moreover, the porous silica powder according to the present invention can be widely used also as an adsorbent for a liquid component or a gas component.

EXAMPLES

Below, the present invention will now be described in more detail by way of examples, but the present invention is not limited only to these examples.

<Production of Porous Silica Powder>

6.75 g of polyethylene glycol 10000 was dissolved in 60 mL of a 0.01 N aqueous acetic acid solution. Furthermore, 24 mL of tetramethoxysilane was added, and suspended by stirring. The resulting suspension was poured into a container and left to stand still in a heated state at 40° C. The suspension gelated about 5 hours after being left to stand still, and solidified. The solidified gel was immersed in water and methanol to remove polyethylene glycol and acetic acid. Next, the gel was dried at 40° C., fired at a temperature of no less than 700° C. for about 1 hour, and then pulverized, and a porous silica powder having a particle size of 180 to 250 μm (60/80 mesh) was obtained by sieving.

The specific surface area (a nitrogen gas adsorption method), the volume of pores having a 100 nm or smaller pore diameter (a nitrogen gas adsorption method), and the average pore diameter (a mercury intrusion method) of the resulting porous silica powder (for Comparative Examples 1 and 2 and Examples 1 to 6) were measured. The resulting physical property values are shown in Table 1 below.

TABLE 1

|  | Comparative Example | | Example | | | | | |
|---|---|---|---|---|---|---|---|---|
|  | 1 | 2 | 1 | 2 | 3 | 4 | 5 | 6 |
| Specific surface area (m$^2$/g) | 459.56 | 306.29 | 88.409 | 8.1137 | 2.3994 | 1.8925 | 1.6687 | 0.71995 |
| Volume of pores having a 100 nm or smaller pore diameter (cm$^3$/g) | 0.5822 | 0.4106 | 0.1404 | 0.023469 | 0.012202 | 0.008423 | 0.004378 | 0.002893 |
| Average pore diameter (μm) | 1.4141 | 1.5276 | 1.2277 | 1.2608 | 2.2877 | 2.0869 | 1.2087 | 0.8475 |

<Performance Evaluation>

Figure 1:
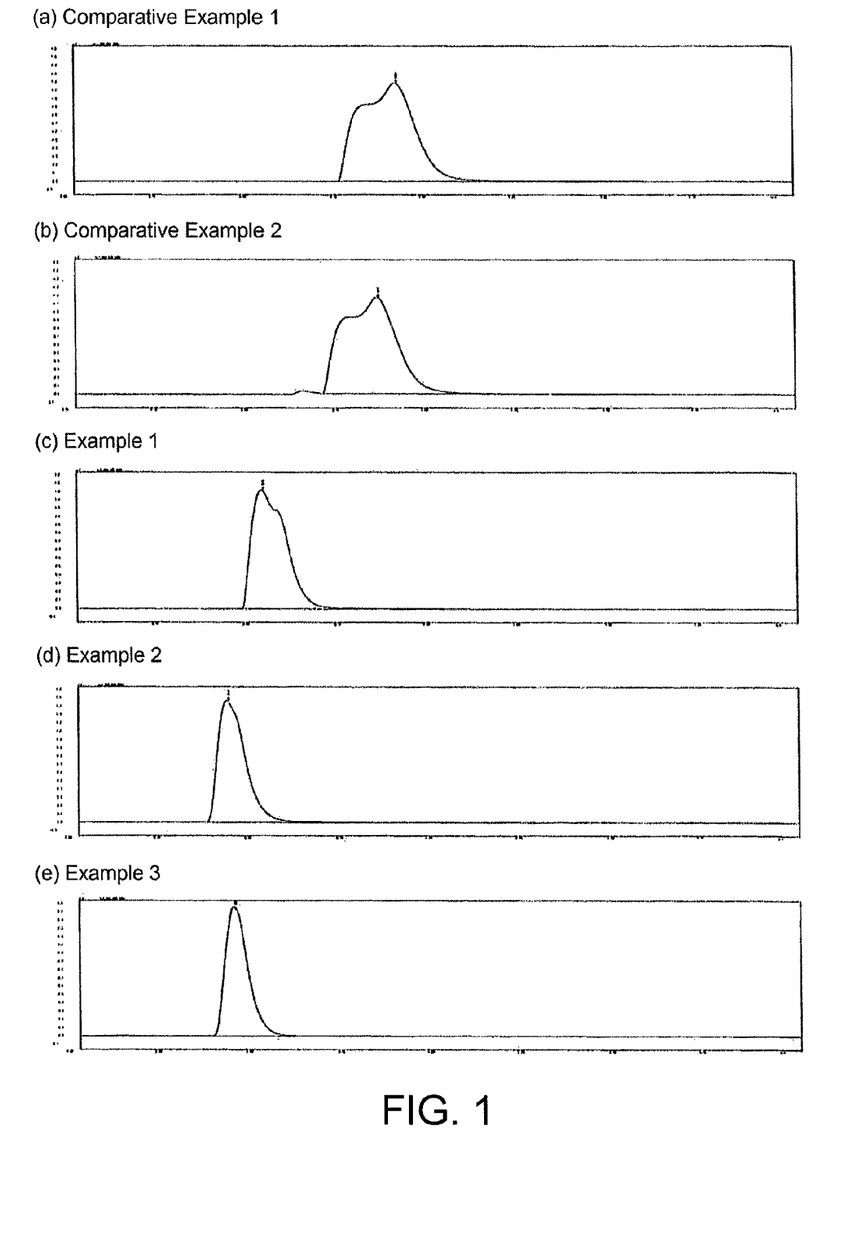
FIG. 1 shows chromatograms of gas chromatography in which columns of Comparative Examples 1 and 2 and Examples 1 to 3 are used.
Figure 2:
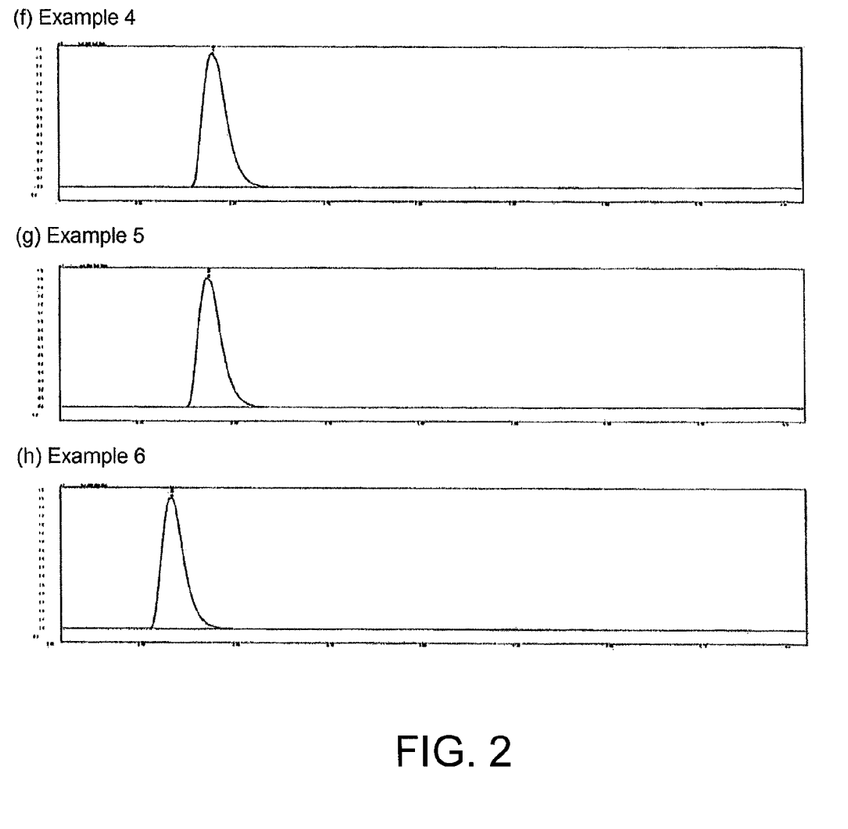
FIG. 2 shows chromatograms of gas chromatography in which columns of Examples 4 to 6 are used.
Figure 3:
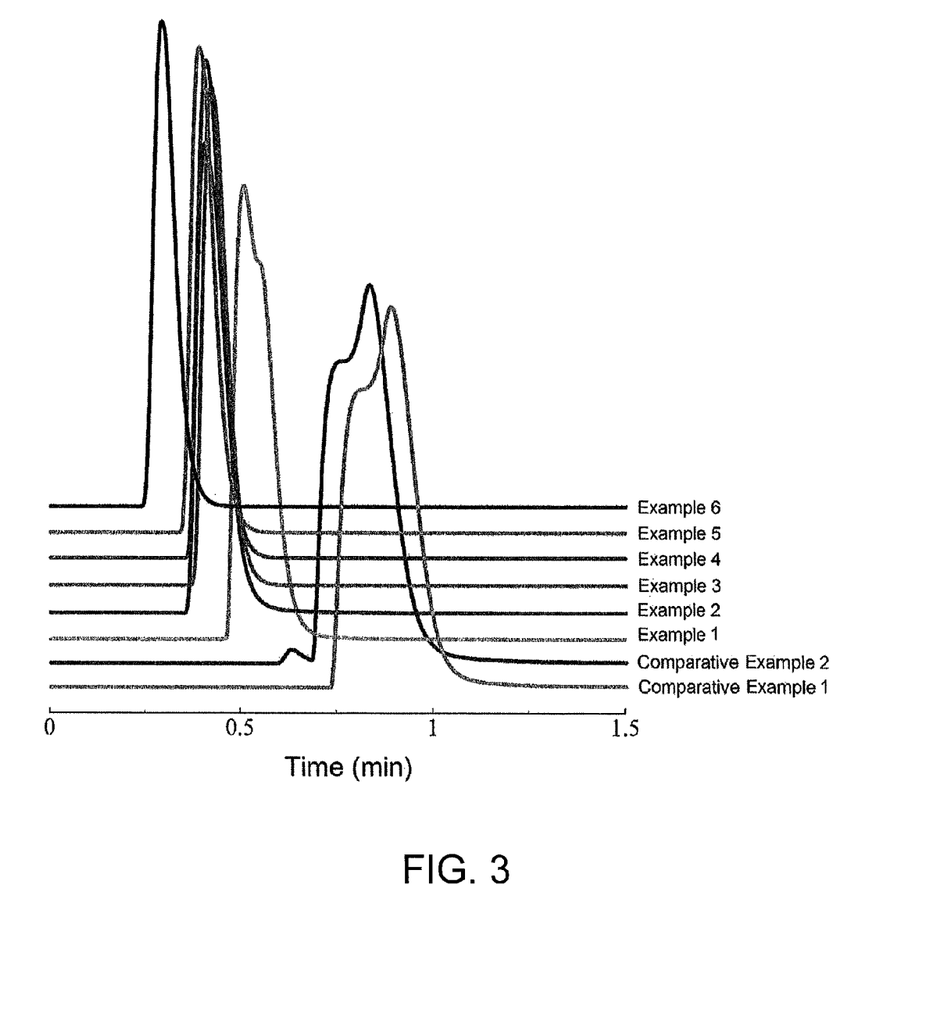
FIG. 3 is a diagram obtained by superposing chromatograms of gas chromatography in which columns of examples and comparative examples are used.

Using 10.0 g each of supports composed of the porous silica powders of comparative examples and examples that had been coated with 0.565 g of polyethylene glycol (an average molecular weight of 20000) as a filler, a glass tube having a length of 2.1 m×an inner diameter of 3.2 mm was uniformly charged therewith to prepare a gas chromatography column. Using the resulting column, gas chromatography was performed by introducing 0.1 mL of propane under conditions having a temperature of 90° C., a carrier gas (N$_2$) at 50 mL/min, and an RD detector. The resulting chromatograms are shown in FIGS. 1 to 3. FIG. 3 is a diagram in which the chromatograms of comparative examples and examples shown in FIGS. 1 and 2 are superposed although the vertical axis and the horizontal axis have different scales.

As can be understood from FIGS. 1 to 3, in Comparative Examples 1 and 2 where the specific surface area was large (there were many fine pores), elution occurred later than in Examples 1 to 6, and also the peak shape was broad with a shoulder, and tailing was observed. This is considered to be because propane entered fine pores such as mesopores and micropores and was adsorbed. On the other hand, sharp peaks were observed on the chromatograms of Examples 1 to 6.

<Comparison with a Gas Chromatography Diatomaceous Earth Support>

Using 10.0 g of a support composed of the porous silica powder of Example 3 that had been coated with 0.565 g of polyethylene glycol (an average molecular weight of 20000) as a filler, a glass tube having a length of 2.1 m×an inner diameter of 3.2 mm was uniformly charged therewith to prepare a gas chromatography column. The same volume of a gas chromatography diatomaceous earth support having a particle size of 180 to 250 μm (60/80 mesh) as the porous silica support was measured and collected as a control (Comparative Example 3), and using this support as a filler after coating it with 0.565 g of polyethylene glycol (an average molecular weight of 20000), a glass tube having a length of 2.1 m×an inner diameter of 3.2 mm was uniformly charged therewith to prepare a gas chromatography column.

Figure 4:
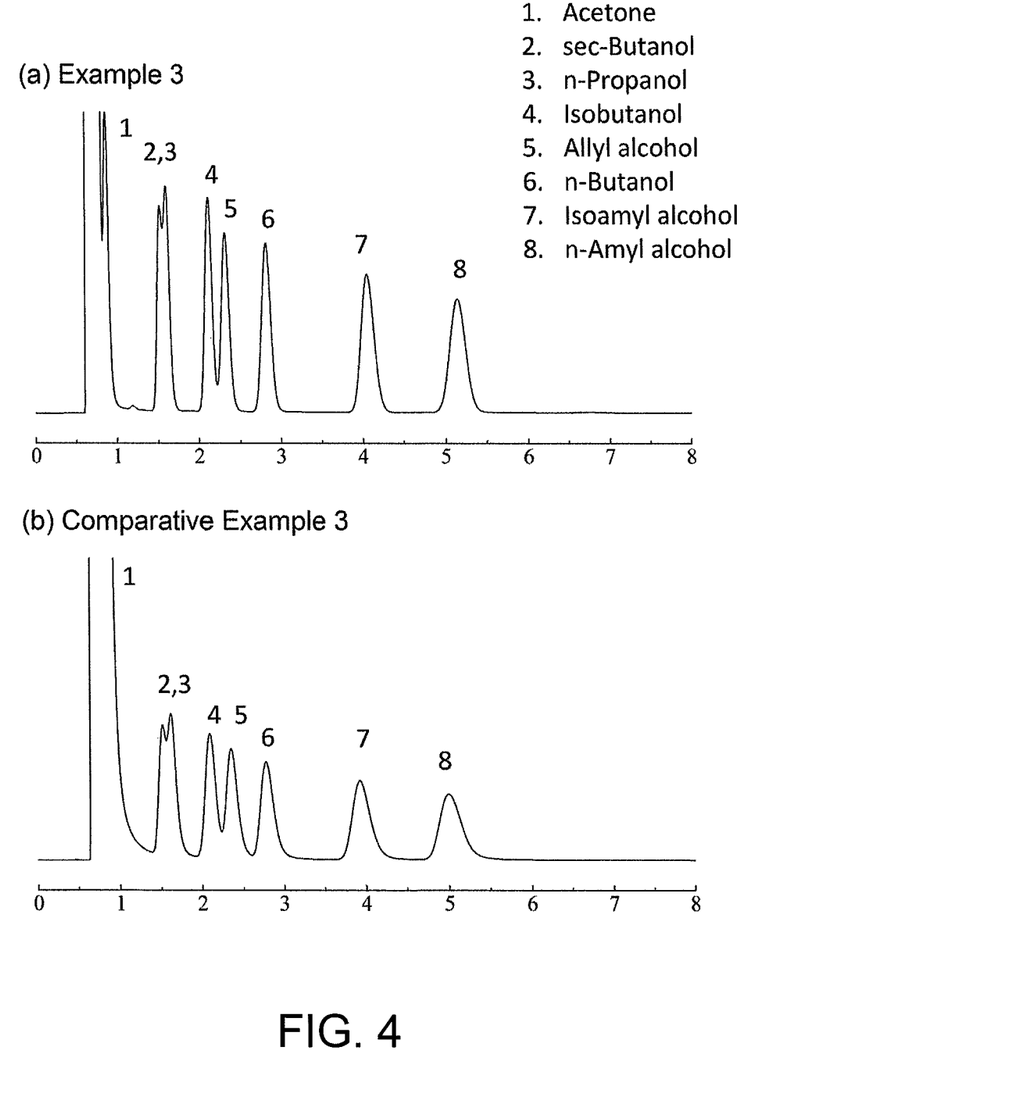
FIG. 4 shows chromatograms of gas chromatography in which columns of Example 3 and Comparative Example 3 are used.
Figure 5:
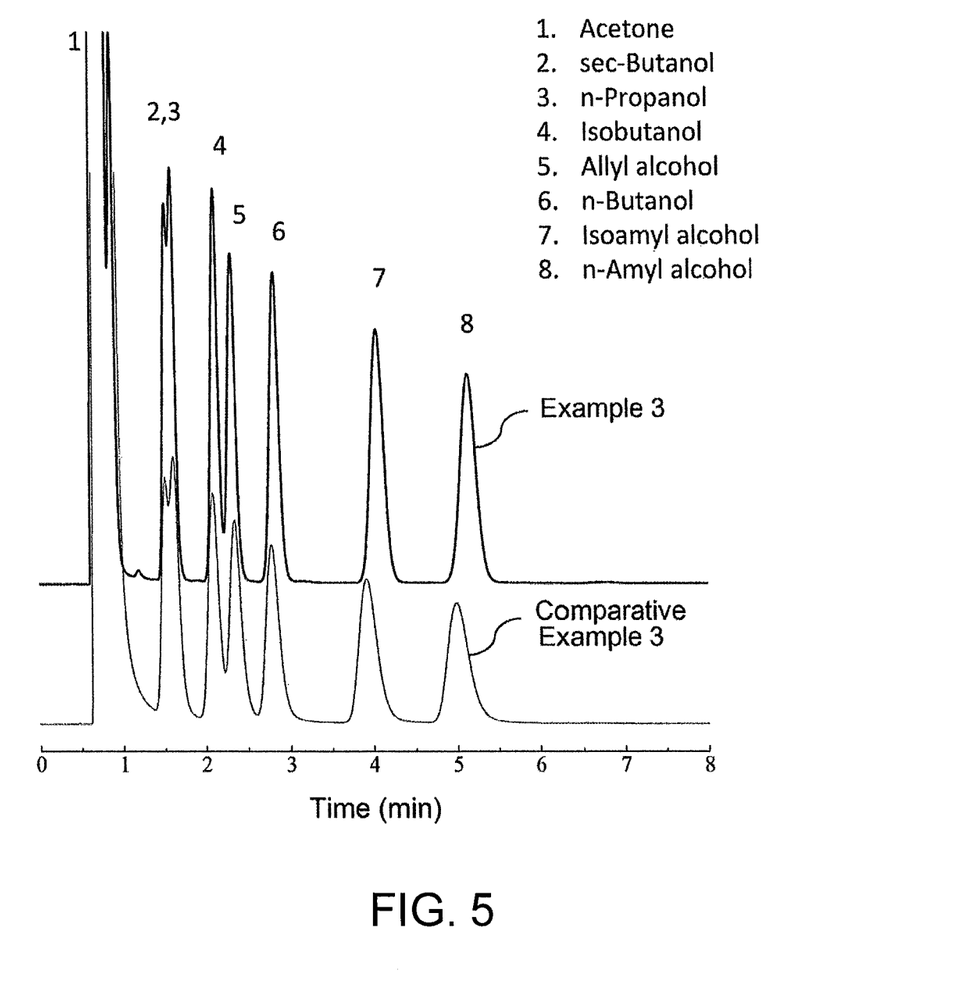
FIG. 5 is a diagram obtained by superposing chromatograms of gas chromatography in which columns of Example 3 and Comparative Example 3 are used.

Using the resulting columns, gas chromatography was performed by introducing 1.0 μL of an acetone solution of sec-butanol, n-propanol, iso-butanol, allyl alcohol, n-butanol, iso-amyl alcohol, and n-amyl alcohol under conditions having a temperature of 90° C., a carrier gas (N$_2$) at 50 mL/min, and an FID detector. The resulting chromatograms are shown in FIGS. 4 and 5. FIG. 5 is a diagram in which the chromatograms of Example 3 and Comparative Example 3 shown in FIG. 4 are superposed.

As can be understood from FIGS. 4 and 5, Example 3 in which a porous silica support that is a product of the present invention was used resulted in a sharper peak shape than Comparative Example 3 in which a gas chromatography diatomaceous earth support that is a conventional product was used. Moreover, compared with Comparative Example 3, tailing of the solvent was extremely suppressed in Example 3.

INDUSTRIAL APPLICABILITY

According to the present invention, a porous silica powder suitable for, for example, a gas chromatography support can be obtained.

The invention claimed is:

1. A porous silica powder consisting of silica particles with a particle size of 100 μm-1000 μm,
   and having an average pore diameter of 0.8 to 5.0 μm,
   a volume of pores with a 100 nm or smaller pore diameter of 0.001 to 0.1 cm$^3$/g,
   a specific surface area of 0.7 to 50.0 m$^2$/g.

2. The porous silica powder according to claim 1, having a bulk specific gravity of 0.2 to 0.7 g/mL.

3. The porous silica powder according to claim 1, obtained by pulverizing or granulating porous silica formed from a reaction mixture comprising acid, a water-soluble polymer, and organosilicate.

4. The porous silica powder according to claim 3, obtained by forming the porous silica from the reaction mixture using a sol-gel method, and firing the porous silica before or after pulverization or granulation.

5. A gas chromatography support, comprising the porous silica powder of claim 1.

6. An adsorbent for a liquid component or a gas component, comprising the porous silica powder of claim 1.

7. The porous silica powder according to claim 2, obtained by pulverizing or granulating porous silica formed from a reaction mixture comprising acid, a water-soluble polymer, and organosilicate.

8. A gas chromatography column comprising:
   a gas chromatography support comprising the porous silica powder of claim 1, wherein a surface of the gas chromatography support is coated with a non-volatile liquid; and
   a tube filled with the gas chromatography support.

* * * * *